3,459,693
PROCESS FOR POLYSTYRENE LATEX AGGLOMERATION

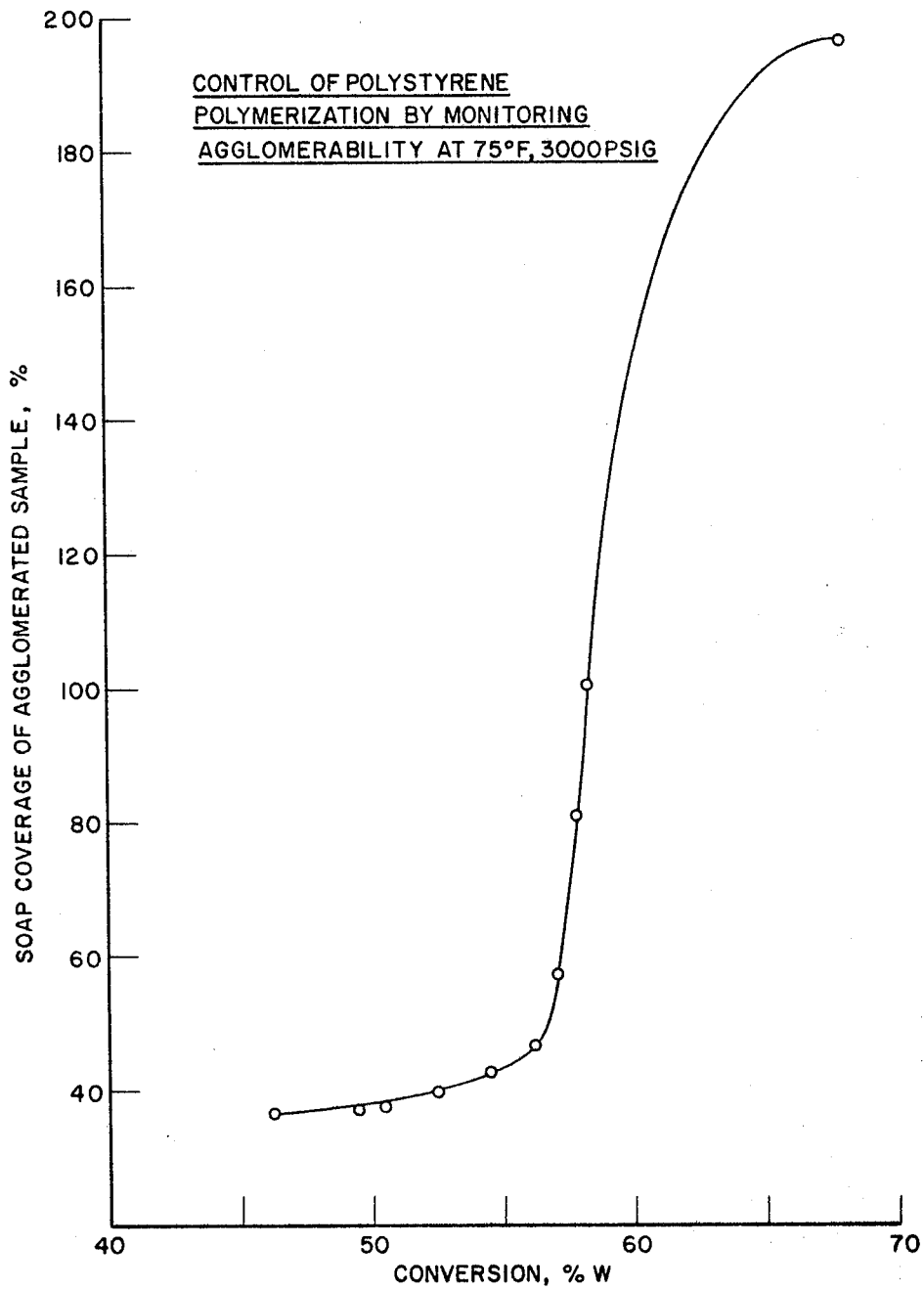

Walter M. Halper, Palos Verdes Peninsula, and Roger F. York, Cypress, Calif., and Fred Dudley Moss, Greenwich, Conn., assignors to Shell Oil Company, New York, N.Y., a corporation of Delaware
Filed July 18, 1966, Ser. No. 565,855
Int. Cl. C08f 33/02
U.S. Cl. 260—23                    5 Claims

ABSTRACT OF THE DISCLOSURE

An improved process for preparing polystyrene latices useful in reinforcing synthetic foam rubber is disclosed comprising (1) shear-homogenizing an agglomerable polystyrene latex to obtain agglomeration of polystyrene particles and (2) concentrating the resulting agglomerated latex to at least 60% by weight solids content.

---

This invention relates to large particle size, high solids content polystyrene latices which have a viscosity of less than 1000 cps. More particularly, the invention relates to an improved process for preparing polystyrene latices to be used especially for reinforcing foams of synthetic rubbers.

Specifically, the invention provides stable polystyrene latices having a solids content of from about 60% to 70% and an average particle size of from 0.3 to 1.0 micron. These polystyrene latices are prepared according to the present invention preferably by emulsion polymerization of styrene employing the so-called "redox" system; controlling and monitoring the polymerization to provide a latex of critically defined properties; agglomerating the latex so prepared by shear-homogenization; and concentrating the resulting latex.

The invention further provides for reinforced foam prepared from synthetic rubber latices, for example agglomerated or unagglomerated styrene-butadiene rubber or polyisoprene rubber latices, employing the polystyrene latices of this invention as the reinforcing latex.

The load-bearing capacity at a given density is an important factor in the economics of foam rubber. When made by the Dunlop process, foams from most synthetic rubber latices fall short of the load-bearing capacity of foam made from natural rubber latex. Consequently, techniques for increasing the load-bearing capacity of synthetic rubber latices have been sought. The commonly employed scheme for increasing the load capacity (modulus), that is, for reinforcing, involves addition of a resin latex. To be effective in preparing foams, the resin latex must be compatible with the rubber latex and undergo gellation with it at essentially the same time as the rubber so that the resin is uniformly distributed through the rubber matrix. This requires that the resin latex have about the same particle size as the rubber latex. Styrene-butadiene resin latices having a styrene content of 70 to 85% have been commonly used for this purpose, but they are deficient in at least one respect. Foam prepared from rubber and copolymer-resin blends takes on an excessive set when compressed 50% for a period of time at elevated temperatures such as 70° C. This high set results because at 70° C. the copolymer-resin is near its glass transition temperature and undergoes deformation; which tends to be permanent if the foam is cooled to room temperature in the compressed condition.

Another important consideration in preparing foam is that of shrinkage. In order to avoid excessive shrinkage in foam products, the water level in formulations must be low, requiring latices of above about 60% solid content. However, only latices having a large part of the polymer present as large particles (compared to the small particles normally resulting from emulsion polymerization) are fluid at high solids.

It is therefore an object of this invention to provide a reinforcing latex which is compatible with synthetic rubber latices, e.g., styrene-butadiene rubber and polyisoprene rubber latices, and which, when blended with the latter, will undergo gellation during foaming at the same time as the latter so that the hard polystyrene particles are uniformly distributed through the rubber matrix. It is a further object to provide a stable polystyrene latex having a solids content of from 60% to 70% and an average particle size of from 0.3 to 1.0 micron or higher. It is still a further object of the invention to provide a process for controlling polystyrene polymerization to obtain a polystyrene latex which has optimum agglomerability. Other objects and advantages of the invention will be apparent from the following detailed description thereof.

Optimum agglomerability is achieved by trial agglomerations as the polymerization reaction proceeds and by terminating the reaction at the conversion which will result in the desired agglomerated particle growth. The latter is measured by soap coverage of the polystyrene particles in the agglomeration sample. FIGURE 1 is a plot of soap coverage of shear-agglomerated latex particle surface versus monomer conversion of styrene to polystyrene for samples taken during the polymerization of a polystyrene latex.

It has been found that these and other objects and advantages may be accomplished by the process of the invention which broadly comprises:

(1) Shear-homogenizing an agglomerable polystyrene latex to obtain agglomeration of the polystyrene particles;

(2) Flashing to remove residual monomer and/or solvent; and (3) Concentrating the resulting agglomerated latex to at least 60% by weight solids content.

The key to the process is in providing an agglomerable polystyrene latex. Several considerations must be taken into account in providing a polystyrene latex suitable for agglomeration. For purposes of describing the invention reference will be made to the preferred embodiment thereof which comprises preparing polystyrene latices by emulsion polymerization of styrene employing the so-called "redox" system. By preparing the latex according to this method, the latex is very close to agglomerability as it comes from the reactor.

Polystyrene in the first place is a hard resin and therefore does not lend itself to conventional agglomeration techniques since the particles will not ordinarily fuse together at the agglomerating temperatures utilized. It has been discovered that, if the latex to be agglomerated contains an appropriate level of a suitable solvent to soften and swell the polystyrene particles, agglomeration and fusion can take place smoothly. In the case wherein the latex is prepared by emulsion polymerization of styrene, unreacted or added monomer for this purpose provides both an economical and convenient process scheme. The amount of styrene or other solvent present during agglomeration must be sufficient to soften the polystyrene particles. It has been discovered that the amount of styrene required for agglomeration is from 50 to 75 parts per hundred parts polystyrene.

Secondly, it has been found that for agglomeration of the latex particles to take place at all, even in the presence of from 50 to 75 parts residual styrene present, the latex must be soap starved, i.e., the amount of soap present in the latex must be less than that required to completely cover the particles with a mono-molecular layer of soap. If the polystyrene particles of the latex are completely covered, shear-homogenization of the latex will result in no significant particle size change.

To provide an agglomerable polystyrene latex, the soap concentration or soap coverage of the particles should be at a level which provides a latex which is stable to normal handling, but unstable to shear-homogenization. This level of soap concentration is determined to be about 30–40% (preferably 32–38%) coverage of the polymer particle surface when applied to a polystyrene latex prepared by emulsion polymerization that has been shortstopped at from 58% to 60% monomer conversion and adjusted if necessary to about 25–30% solids content. It is also recognized that as agglomeration of the particles proceeds, the particle surface area becomes less, and accordingly less soap is required to cover or stabilize the larger particles than was required to cover the smaller unagglomerated particles. The optimum soap level of the agglomerable polystyrene latex is obtained when after agglomeration the soap coverage of the latex particles is 95–100%. Any of the well-known fatty acid or rosin soaps, e.g., monocarboxylic acid soaps having 12–24 carbon atoms per molecule may be used.

Thirdly, it has been discovered that at a soap coverage of about 30–40% and a residual styrene content of from 50 to 75 parts per hundred parts polystyrene, the agglomeration can best be accomplished within a very narrow monomer conversion range, i.e., about 56% to 63%. At 75° F., if agglomeration is attempted at less than 57% monomer conversion, substantially no agglomeration occurs. On the other hand, if the monomer conversion is in excess of about 60%, coagulation of the particles occur at 75° F. By going to high temperatures, the conversion can be increased to about 63% and correspondingly by going to lower temperatures normally unagglomerable conversion levels can be made to agglomerate.

In one of its aspects, the present invention provides a technique for determining the optimum point during the preparation of the polystyrene latex by emulsion polymerization at which agglomeration of the latex particles is to be accomplished. The technique comprises monitoring the agglomerability of the latex during the polystyrene polymerization to obtain the optimum agglomerable latex. The monitoring is accomplished by continuously shear homogenizing a reactor slipstream and testing its particle growth such as by measuring surface tension, which is an excellent secondary measure of soap coverage, which, in turn, is an accurate indication of particle size. The soap coverage may be determined by the so-called "soap titration" method which comprises plotting surface tension against soap saturation.

Referring to FIGURE 1, a sharp change occurs in the soap coverage (surface tension) of the latex particles as agglomeration starts (53%); the slope of the curve is then quite steep until the agglomerated particles become soap saturated (58% in this instance). Optimum agglomerability of the latex particles is obtained when the soap coverage of the agglomerated particles just reaches about 100% and is determined by continually sampling the polymerization reaction, agglomerating these samples and determining the soap coverage of the agglomerated particles. The recipe for the emulsion polymerization of styrene contains sufficient soap to provide 30% to 40% particle coverage at about 58% to 60% monomer conversion. When this point is reached, the polymerization is shortstopped. The resulting agglomerable polystyrene latex is then agglomerated by passing it through a shear homogenizer, such as a Manton-Gaulin homogenizer, using a pressure of 500 to 7,000 (preferably 750 to 5,000) p.s.i. and a temperature range of 50° to 110° F.; the agglomerated latex is then flashed to remove residual monomer and concentrated to at least 65% solids content, e.g., 65% to 70%. At a solids content in excess of 65%, the viscosity of the polystyrene latex must not exceed about 1,000 cps., if it is to be commercially acceptable. It has been determined that an agglomerated polystyrene latex at about 69% to 70% solids content has a Brookfield viscosity (No. 2 spindle at 20 r.p.m.) of less than 1,000 cps., e.g., 600 to 800 cps. The viscosity of the agglomerated latex at 65–70% solids content is generally from 300–900 cps.

The agglomerability of the feed latex can be controlled by adjusting the monomer content and/or solids content thereof or by changing the homogenation temperature. It has been found that agglomeration takes place more readily at lower homogenization temperatures. Accordingly, if it is found that the sample taken from the polymerization reaction shows signs of coagulation in the homogenizer, the sample can be restored to optimum agglomerability by raising the homogenization temperature or, as an alternative, by diluting it with water and/or styrene. Obviously, due to reactor sampling and monitoring the situation will usually not arise where the optimum agglomerability point has not yet been reached. However, if due to faulty equipment or a time lag in the monitoring sequence, the polymerization was shortstopped before optimum agglomerability conditions were obtained, such conditions could be achieved by lowering the agglomeration temperature or by removing water or styrene from the system.

To illustrate the manner in which the invention may be carried out the following examples are given. It is to be understood that the examples are for purposes of illustration and the invention is not to be regarded as limited to any specific conditions recited therein. Unless otherwise specified, parts disclosed in the examples are parts by weight.

The foams prepared in the following examples are prepared by the mechanical foaming method, referred to as the "Dunlop Process." This process consists generally of beating, whisking or whipping air into a specific amount of a compounded latex in a container on a machine equipped with a wire whip until the desired colume is obtained. Toward the end of the frothing a zinc oxide dispersion is added and a delayed gelling agent, such as a dispersion of sodium silicofluoride. The foam is then poured into the mold and the cover thereof placed in position.

The gelling or setting of the foam is timed to take place in from six to ten minutes, or, if a shorter time is desired, heat may be applied. The pH of the ungelled foam is generally from 8.2 to 8.5.

After the foam has gelled it is vulcanized with wet steam at 210° to 212° F. The foam is immediately removed from the mold after cure, washed thoroughly with water to remove the soap and serum, the excess water being removed by squeezing. It is then dried in hot air, cooled and ready for testing.

A more detailed discussion of preparing latex foam, as well as compounding and processing thereof, is found in the book, "The Vanderbilt Latex Handbook," published by R. T. Vanderbilt Co., New York, N.Y. (1954).

EXAMPLE I

This example illustrates the preparation of an agglomerated polystyrene latex by emulsion polymerization:

A reactor having a slipstream for testing purposes is charged with the following ingredients:

| Ingredient: | Parts by weight |
|---|---|
| Styrene | 100 |
| Tertiary dodecyl mercaptan | 0.08 |
| Diisopropylbenzene monohydroperoxide (DIP) | 0.04 |
| Water | 120 |
| Potassium oleate | 2 |
| Potassium sulfate | 1 |
| Naphthalene sulfonate-formaldehyde condensate | 1 |
| Sodium formaldehyde sulfoxylate (activator | 0.02 |
| Tetrasodium ethylene diamine tetra-acetic acid tetrahydrate | 0.0136 |
| Ferrous sulfate heptahydrate | 0.0005 |
| In water | 5 |
| Oxygen scavenger: | |
| Sodium dithionite | 0.003 |
| Potassium hydroxide | 0.0015 |
| Water | 0.2 |

The reaction mixture is stirred at a temperature of 50° F. After the polymerization has continued for about 500 minutes, allowing for a conversion rate of about 1% per 10 minutes, a continuous sample of the polymerization mass is withdrawn into the slipstream. From the slipstream it is passed through a homogenizer at 3,000 p.s.i. and 75° F. and tested for particle growth by the "surface tension" method. When the surface tension of samples show that they are agglomerating as desired, the polymerization reaction is shortstopped by adding shortstop solution consisting of 0.15 part potassium dimethyldithiocarbamate, 0.015 part sodium nitrite and 10.2 parts water. The reaction mixture is then passed through a homogenizer using a temperature of 75° F. and 3,000 p.s.i. The resulting agglomerated latex is stripped of residual styrene and concentrated to a solids content of from 69% to 70%. The resulting polystyrene latex has the following properties:

Viscosity—Brookfield viscosity using a No. 2 spindle
at 20 r.p.m. _____cps__ 650
Average particle size _____microns__ 0.6
Solids content _____percent by weight__ 69.0

FIGURE 1 is a plot of percent monomer conversion versus soap coverage of the agglomerated samples from the slipstream of Example I. From the graph it can be seen that the testing range for detecting optimum agglomerability of the latex is narrow. In this instance it is from about 56% to less than 60% monomer conversion, since, as set forth previously, the testing is for the purpose of determining the instant during the polymerization where, when the latex is agglomerated, the soap coverage of the agglomerated latex is 100%.

Surface tension measurements may be used to follow changes in percent of soap coverage. In a typical case, an agglomerated sample of latex having a surface tension of 50 dynes per centimeter was found to have a soap coverage of 60%. At 100% soap coverage, the surface tension was 35 dynes per centimeter, and this did not change with increasing amounts of soap.

EXAMPLE II

The procedure of Example I is repeated with the exception that the polymerization of styrene is allowed to proceed until the monomer conversion is 65.5%. The slipstream at this monomer conversion showed signs of coagulation in the Manton-Gaulin homogenizer. The shearing inlet temperature of the homogenizer was increased to 110° F. and the signs (coagulum) of coagulation disappeared. The polymerization is then shortstopped as in Example I and the latex passed through a homogenizer using a temperature of 110° F. at 3,000 p.s.i.

EXAMPLE III

This example illustrates the advantages gained by monitoring the agglomerability of each polymerization rather than attempting to duplicate results from one reaction charge to another.

The polymerization procedure of Example I is repeated using the same recipe in each of two individual reaction charges; one charge of 20 gallons and the other of 500 gallons. At a polymerization rate of 1% conversion each 10 minutes, both reactions were shortstopped about 20 minutes after the soap coverage of the agglomerated sample had reached 100%. The 20 gallon reaction was at 57% conversion, while the 500 gallon reaction was at 59% conversion. Accordingly, neither the reaction time nor monomer conversion value can be relied upon to precisely determine optimum agglomerability of the latex.

EXAMPLE IV

This example illustrates the suitability of agglomerated polystyrene latices for reinforcing foam from polyisoprene latices.

The properties of the polystyrene latex, prepared according to Example I, and the polyisoprene latex employed are given below:

| Property | Polyisoprene | Polystyrene |
|---|---|---|
| pH | 10.6 | 10.3 |
| Average particle size (microns) | 1.0–1.6 | 0.6 |
| Solids content, percent | 65.7 | 68 |
| Viscosity at 65% total solids (cps.) | 100 | 600 |

Several foam samples are prepared from blends of the polyisoprene and polystyrene latices by the physical frothing process outlined previously and the properties of the resulting foams are determined. The results of these tests are given in the following table.

TABLE.—REINFORCEMENT OF POLYISOPRENE FOAM WITH AGGLOMERATED POLYSTYRENE LATICES

| | Control sample | Sample 1 | Sample 2 | Sample 3 |
|---|---|---|---|---|
| Base latex | Polyisoprene | Polyisoprene | Polyisoprene | Polyisoprene |
| Percent wt. of rubber | 100 | 87 | 83 | 78.5 |
| Resin latex | | Polystyrene | Polystyrene | Polystyrene |
| Percent wt. of polymer | | 13 | 17 | 21.5 |
| Compression modulus (K-value) (cushion): | | | | |
| 1 day | | 5.2 | 6.9 | 7.5 |
| 14 days | 3.5 | | 6.6 | 7.3 |
| Shrinkage, percent | 9 | 9 | 8 | 8 |
| ASTM compression set percent, 50% compression, 22 hr., 70° C | 8 | 17 | 19 | 22 |
| ASTM compression set percent, 50% compression, 20° C., 70 hr | 1.8 | 3.3 | 3.6 | 4.4 |
| Foam density, g./l. | 87 | 85 | 86 | 85 |
| Tensile, p.s.i. | 5.7 | 5.1 | 5.0 | |
| Elongation, percent | 180 | 120 | 90 | |
| Hot wet tensile, p.s.i. | 10 | 8 | 8 | 5.5 |
| "K reinforced/K" control | | 1.5 | 2.0 | 2.1 |

From the above table it is demonstrated that the compression modulus of foam prepared from polyisoprene latex is increased by reinforcing it with agglomerated polystyrene latex. It can further be seen that the use of a latex blend consisting of 87% and 13% by weight of polyisoprene and polystyrene respectively, provides a foam having not only excellent compression modulus but also good compression set and elongation at break. The most favorable polystyrene levels will of course vary from foam to foam depending upon the properties of the latex used in preparing the foam, as well as the conditions of the foaming process itself.

EXAMPLE V

This example illustrates the suitability of agglomerated polystyrene latices for reinforcing foam prepared from oil-extended polyisoprene latices. The polystyrene latex is that described in Example I. The oil-extended polyisoprene latex is prepared from the polyisoprene latex of Example IV by homogeneously incorporating into the polyisoprene 33 parts per hundred parts rubber of a substantially non-aromatic hydrocarbon extending oil which has a viscosity-gravity constant of 0.820. The polystyrene latex is blended in varying proportions with the oiled polyisoprene latex and whipped into a foam utilizing the procedure of Example IV. The properties of the resulting foams are determined and given in the following table.

TABLE

|  | Control | Sample 1 |
|---|---|---|
| Composition: |  |  |
| Oil percent by wt | 25 | 21.6 |
| Polyisoprene, percent by wt | 75 | 65.1 |
| Polystyrene, percent by wt |  | 13.3 |
| Compression modulus (K-value): |  |  |
| 1 day | 2.3 | 3.8 |
| 14 days | 2.3 | 3.7 |
| Shrinkage | 8 | 8 |
| Foam density, g./l | 86 | 85 |
| Tensile, p.s.i | 6.0 | 4.6 |
| Hot wet tensile, lb | 6 | 6 |
| "K reinforced/K" control |  | 1.65 |

Example V like Example IV demonstrates the increase in compression modulus obtained in using agglomerated polystyrene latex for reinforcing foam from polyisoprene latex.

EXAMPLE VI

This example illustrates the reinforcement of foam prepared from styrene/butadiene latices with agglomerated polystyrene latices.

A polystyrene agglomerated latex prepared according to the procedure of Example I is blended with an agglomerated styrene/butadiene rubber latex having a solids content of 66.3% by weight, a particle size 0.55 micron, and containing 74.5% by weight butadiene and 25.5% by weight styrene. The blend of latices containing 15% by weight agglomerated polystyrene latex was made into foam according to the Dunlop process of Example IV. The resulting foam exhibited good properties including a compression modulus (ASTM) of 7.2, as compared to SBR foam in the absence of reinforcement which has a compression modulus of 4.0.

TABLE

| Latex used: |  |  |
|---|---|---|
| SBR rubber, phr | 100 | 85 |
| Polystyrene resin, phr |  | 15 |
| Compression modulus (K-value) | 4.0 | 7.2 |
| Shrinkage, percent | 11.5 | 8 |
| Compression set, ASTM | 9.1 | 10.2 |
| Foam Density, g./l | 75 | 62 |
| "K Reinforced/K" control |  | 1.8 |

We claim as our invention:
1. The process for agglomeration of a polystyrene latex to form a latex having an average particle size from 0.3 to 1.0 microns which comprises:
   (a) providing a polystyrene latex containing 25–30% by weight of polystyrene, 30–40% of the surface area of the polystyrene latex particles covered with a soap film, the latex also containing 50–75 parts by weight, per 100 parts of polystyrene, of a volatile hydrocarbon solvent therefor;
   (b) subjecting the latex to homogenizing at 50–110° F., using pressures of 500–7,000 p.s.i., whereby agglomeration of the latex particles is effected;
   (c) and thereafter volatilizing water and solvent to obtain an agglomerated latex containing at least about 65% solids.
2. A process for preparing stable polystyrene latices having a particle size of from 0.3 to 1.0 microns; a solids content of from 65 to 70% by weight; and a viscosity of less than 1,000 cps. which comprises:
   (a) emulsion polymerizing styrene with a redox polymerization system, in the presence of a soap emulsifying agent which provides for polystyrene latex particles at 56–63% styrene conversion, 30–40% of the surface area of the particles being covered with a soap film;
   (b) withdrawing a sample from the polymerization reaction mixture;
   (c) agglomerating the sample by shear-homogenization;
   (d) determining the soap coverage of the agglomerated sample;
   (e) repeating steps (b) through (d) as polymerization continues until the soap coverage of the agglomerated samples is 100%;
   (f) shortstopping the polymerization reaction at 95–100% soap coverage of the agglomerated sample as determined by steps (b) through (e);
   (g) agglomerating the resulting latex by passing it through a shear-homogenizer at from 750 to 5,000 p.s.i. and at a temperature of from 50° to 110° F; and
   (h) thereafter volatilizing water and monomer to obtain at least 65% solids.
3. A process according to claim 1 wherein the polystyrene solvent is monomeric styrene.
4. A process according to claim 1 wherein the soap coverage of the latex particles prior to agglomeration is 32–38%.
5. A process according to claim 2 wherein the styrene polymerization is carried to 56–63% conversion before shortstopping.

References Cited

UNITED STATES PATENTS

| 3,214,401 | 10/1965 | McKenzie et al. | 260—29.6 |
| 3,276,844 | 10/1966 | Davison et al. | 23—253 |
| 3,318,831 | 5/1967 | Gauslaa | 260—29.7 |
| 3,372,134 | 3/1968 | Pierson et al. | 260—29.7 |

FOREIGN PATENTS

| 976,212 | 11/1964 | Great Britain. |

DONALD E. CZAJA, Primary Examiner

R. A. WHITE, Assistant Examiner

U.S. Cl. X.R.

260—23, 27, 29, 33